(12) United States Patent
Otowa et al.

(10) Patent No.: US 12,139,624 B2
(45) Date of Patent: Nov. 12, 2024

(54) INK FOR INKJET PRINTERS

(71) Applicant: Hitachi Industrial Equipment Systems Co., Ltd., Tokyo (JP)

(72) Inventors: Takuya Otowa, Tokyo (JP); Hiroshi Sasaki, Tokyo (JP); Tatsunosuke Suzuki, Tokyo (JP); Masahiko Ogino, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 109 days.

(21) Appl. No.: 17/800,135

(22) PCT Filed: Mar. 16, 2021

(86) PCT No.: PCT/JP2021/010675
§ 371 (c)(1),
(2) Date: Aug. 16, 2022

(87) PCT Pub. No.: WO2021/250967
PCT Pub. Date: Dec. 16, 2021

(65) Prior Publication Data
US 2023/0087688 A1    Mar. 23, 2023

(30) Foreign Application Priority Data

Jun. 9, 2020    (JP) .................................. 2020-099800

(51) Int. Cl.
*C09D 11/32*    (2014.01)
*C09D 11/10*    (2014.01)
(Continued)

(52) U.S. Cl.
CPC .............. *C09D 11/32* (2013.01); *C09D 11/10* (2013.01); *C09D 11/328* (2013.01); *C09D 11/36* (2013.01)

(58) Field of Classification Search
CPC ....... C09D 11/32; C09D 11/10; C09D 11/328; C09D 11/36
See application file for complete search history.

(56) References Cited

U.S. PATENT DOCUMENTS

| 5,273,575 A | 12/1993 | de Saint Romain |
| 2002/0137817 A1* | 9/2002 | Isogawa ............... C09D 11/102 523/160 |

(Continued)

FOREIGN PATENT DOCUMENTS

| CN | 108463517 A | 8/2018 |
| JP | 2002-211100 A | 7/2002 |

(Continued)

OTHER PUBLICATIONS

International Search Report (PCT/ISA/210) issued in PCT Application No. PCT/JP2021/010675 dated Jun. 15, 2021 with English translation (five (5) pages).

(Continued)

*Primary Examiner* — Yaovi M Ameh
(74) *Attorney, Agent, or Firm* — Crowell & Moring LLP

(57) ABSTRACT

This invention provides an ink for inkjet printers with both properties; i.e., good visibility of printing dots after heating and high dissolution stability. The ink for inkjet printers of the invention comprises a color material, a solvent, and resin, wherein the color material comprises a first metal complex and a second metal complex comprising metal ions selected from among iron ions, manganese ions, copper ions, cobalt ions, and chromium ions and ligands bound thereto, and the ligands comprise diketone structures incorporated in the chemical structures thereof.

6 Claims, 2 Drawing Sheets

Visible

Hardly visible

Not visible

(51) Int. Cl.
  *C09D 11/328* (2014.01)
  *C09D 11/36* (2014.01)

(56) References Cited

U.S. PATENT DOCUMENTS

2003/0041775 A1   3/2003  Deardurff et al.
2009/0289973 A1   11/2009 Makuta et al.
2019/0023930 A1*  1/2019  Swisher .............. C09D 11/52

FOREIGN PATENT DOCUMENTS

| JP | 2003-128949 A | 5/2003 |
| JP | 2006-312711 A | 11/2006 |
| JP | 2011-142146 A | 7/2011 |
| JP | 2013-53285 A | 3/2013 |

OTHER PUBLICATIONS

Japanese-language Written Opinion (PCT/ISA/237) issued in PCT Application No. PCT/JP2021/010675 dated Jun. 15, 2021 (four (4) pages).
Chinese-language Office Action issued in Chinese Application No. 202180011255.6 dated Dec. 27, 2022 (six (6) pages).

* cited by examiner

Good print quality    Acceptable print quality

INK FOR INKJET PRINTERS

TECHNICAL FIELD

The present invention relates to an ink used for inkjet printers.

BACKGROUND ART

Inkjet printers are used to record the expiration date and traceability information including product numbers of many industrial products, such as foods and mechanical components. When a printing substrate is made of a ceramic, metal, or other material, the printing substrate may be heated at 300° C. or higher after printing.

Color materials that are generally used, such as azo dyes, triphenylmethane dyes, and carbon black pigments, however, are thermally degraded at the time of heat treatment. After the heat treatment, accordingly, the color density of printing dots may become faded or printing dots may disappear.

An example of a color material that maintains printing dots visible after heating is a transition metal oxide. However, a transition metal oxide generally has a high specific gravity. Thus, a transition metal oxide dispersed in an ink liquid would be precipitated, disadvantageously, and the resulting ink would be problematic in terms of its dispersion stability.

There is a method comprising adding a salt or complex of a transition metal that can be dissolved in an ink solvent to an ink as a transition metal oxide precursor. Printing dots are formed of an ink supplemented with a transition metal oxide precursor, and the printing dots are heated after printing. As a result of heating, a transition metal oxide is generated from a transition metal oxide precursor within printing dots. As a result, a transition metal oxide-derived color can be developed and visibility of printing dots can be maintained.

Patent Document 1 discloses an ink consisting of a solution of metallic salt that can be dissolved in a solvent for the purpose providing an ink that can be used for marking at 300° C. or higher and that can be sprayed in jets on. Patent Document 1 demonstrate examples of metallic salts, such as inorganic and organic metal salts of chromium, manganese, iron, cobalt, copper, zinc, molybdenum, tin, antimony, boron, lead, zirconium, titanium, and vanadium.

Patent Document 2 discloses a novel ink preparation containing a phthalocyanine dye that can increase the color saturation. An ink preparation is supplemented with a metal-phthalocyanine complex.

PRIOR ART DOCUMENTS

Patent Documents

Patent Document 1: U.S. Pat. No. 5,273,575
Patent Document 2: JP 2003-128949 A

SUMMARY OF THE INVENTION

Objects to Be Attained by the Invention

A metallic salt added to an ink in Patent Document 1 is disadvantageous in that it is likely to be precipitated because of insufficient dissolution stability in an organic solvent.

The amount of the phthalocyanine-based metal complex used in Patent Document 2 to be dissolved in an organic solvent is small. In addition, the proportion of metals constituting the metal complex is small. Thus, the amount of a transition metal oxide produced in printing dots after the heat treatment is small, and the resulting visibility is low.

The present invention provides an ink for inkjet printers with both properties; i.e., good visibility of printing dots after heating and high dissolution stability.

Means for Attaining the Objects

The ink for inkjet printers according to the present invention comprises a color material, a solvent, and resin, wherein the color material comprises a first metal complex and a second metal complex comprising metal ions selected from among iron ions, manganese ions, copper ions, cobalt ions, and chromium ions and ligands bound thereto, and the ligands comprise diketone structures incorporated in the chemical structures thereof.

Effects of the Invention

According to the present invention, both the good visibility of printing dots after heating and the high dissolution stability can be realized.

EMBODIMENTS OF THE INVENTION

Figure 1:
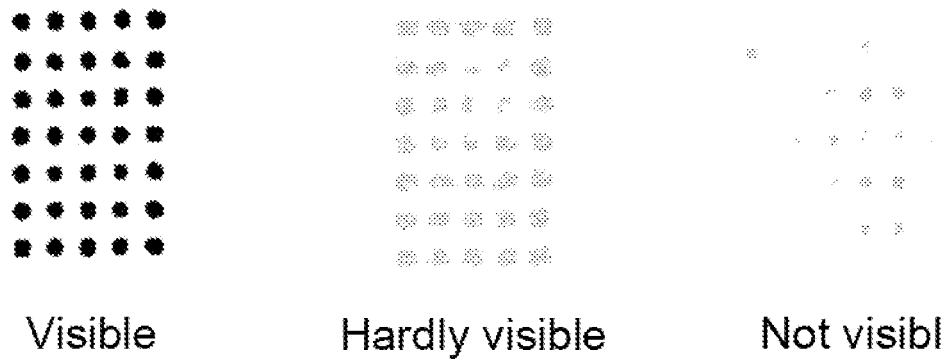
FIG. 1 shows the results of evaluation on visibility of printing dots according to the examples.

In an embodiment of the present invention, printing dots are formed when an ink for inkjet printers is placed on a printing substrate and a solvent is dried. At the outset, an ink for inkjet printers forms printing dots on a heat-resistant printing substrate, such as a ceramic substrate. Highly-concentrated transition metal ions in the complex contained in the formed printing dots are converted into colored transition metal oxides upon heating and color is thus developed. As a result, visibility of printing dots is maintained after heating. An oxide is formed depending on a type of a metal complex.

<Ink for Inkjet Printers>

An ink for inkjet printers comprises at least a color material and a solvent. An ink for inkjet printers is obtained by, for example, dissolving, stirring, and mixing a color material and a solvent using an overhead stirrer and filtrating the resulting mixture through a filter with a pore diameter of 0.25 μm to 10 μm.

<Color Material>

A color material comprises two or more metal complexes comprising metal ions selected from among iron ions, manganese ions, copper ions, cobalt ions, and chromium ions and ligands bound thereto. Since a printing substrate is often a white substrate, iron, copper, cobalt, manganese, or chromium ions are used as transition metal ions because oxides thereof can develop a highly visible color on a white substrate. A ligand of a complex constituting a metal complex comprises a diketone structure incorporated in its chemical structure. Thus, dissolution stability is improved and generation of precipitates can be suppressed.

A printing substrate is subjected to heat treatment under various temperature conditions. For example, the maximal temperature may be 500° C. or 1,000° C. Heating conditions for one of the two types of metal complexes to undergo generation of a metal oxide and color development of printing dots are different from heating conditions for the other. With the use of two or more types of metal complexes in combination, accordingly, printing dots can develop color under extensive heating conditions.

A chemical structure of a complex is represented by Structural formula (1).

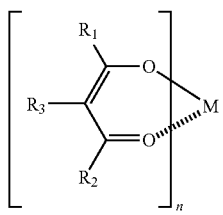

Structural formula (1)

In Structural formula (1), M represents any of iron, manganese, copper, cobalt, or chromium. When two types of metal complexes are designated as a first metal complex and a second complex, respectively, it is preferable that the first metal complex comprise iron ions and the second metal complex comprise manganese, cobalt, or chromium ions. A metal oxide of a metal complex comprising iron ions is formed under heating conditions in which the maximal temperature is 1,000° C., and a metal oxide of a metal complex comprising manganese, cobalt, or chromium ions is formed under heating conditions in which the maximal temperature is 500° C. With the use of such metal complexes in combination, accordingly, an ink that can produce printing dots capable of color development under extensive heating conditions can be provided.

In Structural formula (1), n represents a coordination number. The coordination number is determined depending on a metal type and an ion valence. $R_1$ and $R_2$ each represent a long-chain or branched alkyl chain or an organic group, such as an aromatic ring group. An alkyl chain may comprise an ether bond, an ester bond, an amide bond, or others. $R_3$ represents hydrogen or a long-chain or branched alkyl chain.

A preferable metal complex is an acetylacetonate complex comprising ligands of acetylacetone represented by Structural formula (1) wherein $R_1$ and $R_2$ are each a methyl group and $R_3$ is hydrogen. This is because the use of acetylacetonate as a ligand would increase the metal content in the metal complex and improve the color-developing ability of printing dots.

It is preferable that $R_1$ be different from $R_2$. This is because the complex is less likely to form a stacking structure and the metal complex is likely to be dissolved in a solvent. An example of a ligand comprising $R_1$ and $R_2$ that are different from each other is ethyl acetoacetate.

As described above, specifically, preferable metal complexes are iron (III) acetylacetonate, manganese (III) acetylacetonate, cobalt (III) acetylacetonate, chromium (III) acetylacetonate, copper (II) acetylacetonate, and copper (II) ethyl acetoacetate.

The amount of a metal complex added is preferably 1% by mass to 30% by mass and more preferably 1% by mass to 15% by mass in total. With the addition of the metal complex in an amount of 1% by mass or more based on the amount of the ink, visibility can be improved. By adjusting the amount of the metal complex to be added to 30% by mass or less based on the amount of the ink, dissolution stability can be improved.

Hereafter, differences between a ligand having a diketone structure and other ligands in terms of dissolution stability and metal content in the metal complex are described.

Table 1 shows the results of comparison among 3 types of metal complexes or metal salt; i.e., the acetylacetonate-based complex, the phthalocyanine-based complex, and nitrate, in terms of dissolution stability in an organic solvent, solubility in an organic solvent, and iron content in the compound. Iron (III) acetylacetonate was used as an example of the acetylacetonate-based complex, iron (II) phthalocyanine was used as an example of the phthalocyanine-based complex, and iron (III) nitrate 9-hydrate was used as an example of the nitrate.

TABLE 1

| | Dissolution stability in organic solvent | Solubility in organic solvent | Iron content in compound (mass %) |
|---|---|---|---|
| Iron (III) nitrate 9-hydrate | Poor | Higher | 13.9 |
| Iron (II) phthalocyanine | Good | Lower | 9.9 |
| Iron (III) acetylacetonate | Good | Higher | 15.9 |

In Table 1, dissolution stability is indicated "Poor" when a precipitate was generated after the complex or salt was allowed to stand at room temperature for 7 days and it is indicated "Good" when no precipitate was generated. Also, solubility in an organic solvent is indicated "Higher" when an extent of solubility was equivalent to or higher than that of iron (III) acetylacetonate, it is indicated "Lower" when an extent of solubility was lower than that of iron (III) acetylacetonate, and it is indicated "Not dissolved" when the complex or salt was not dissolved at all.

Concerning a metal salt, such as nitrate, metal content in the compound is equivalent to that of the acetylacetonate-based metal complex, solubility thereof in an organic solvent is high, but dissolution stability is low. For example, a precipitate is generated when it is allowed to stand at room temperature for several days.

In comparison with the acetylacetonate-based transition metal complex having a diketone structure, the phthalocyanine-based transition metal complex has lower metal content in the compound and produces a smaller amount of a metal oxide from a complex per unit weight. In general, an extent of solubility of the phthalocyanine-based metal complex in an organic solvent is low.

Accordingly, use of a metal complex comprising a ligand having a diketone structure was found to be effective in order to realize both the visibility of printing dots and high dissolution stability.

In order to adjust the color of printing dots before heating, the color material may be supplemented with dyes or pigments other than the metal complex described above. Dyes and pigments are not particularly limited, provided that solubility and dispersibility in a solvent are sufficient. Examples of dyes and pigments that can be used include azo dye, nigrosine dye, triphenylmethane dye, diphenylmethane dye, and carbon black pigment. The triphenylmethane dye, i.e., crystal violet, and the carbon black pigment that are less likely to form an aggregate with metal ions are particularly preferable.

<Solvent>

A solvent is used to dissolve ink materials. Main components of an ink solvent are preferably an alcohol solvent and a ketone solvent. This is because the boiling points of such solvents are 100° C. or lower, they are dried rapidly, and their ability for dissolving a color material is high. The term "main component" used herein refers to a component that is contained in the highest amount. Among alcohol solvents, methanol, ethanol, 1-propanol, and 2-propanol are preferable. An alcohol having 3 or fewer carbon atoms is preferable to suppress odor. Among ketone solvents, acetone, 3-methyl-2-butanone, and 2-butanone are preferable.

In addition to the main components, a co-solvent may be added to improve solubility of ink materials or for other purposes. Examples of preferable co-solvents include carboxylic ester solvents, such as acetic ester, propionic ester, butyric ester, and valeric ester, ether solvents, such as tetrahydrofuran, and glycol solvents.

<Resin>

An ink may be supplemented with resin, so as to adjust a printing dot size on a printing substrate, develop adhesiveness, and improve dissolution stability of a color material. A resin is not particularly limited as long as it is material that is dissolved in a solvent and compatible with a color material. One of cellulose resin, polyol resin, butyral-modified polyvinyl alcohol resin, polyester resin, acrylic resin, styrene-acrylic resin, silicone resin, and rosin resin is used by itself or two or more thereof are used in combination. Resin content is preferably more than 0% by mass to 32% by mass or less.

<Additive>

An ink may be supplemented with additives in order to regulate various physical properties of an ink and printing dots. When an ink is used for a charge control-type inkjet printer, for example, a conductive agent may be added to reduce specific resistance of the ink, and printing can be performed as desired at a low voltage. Also, modified silicone prepared by introducing an organic group to a part of a polysiloxane chain to improve solubility in an organic solvent may be added to an ink so as to smooth the configuration of printing dots and improve the visibility.

<Inkjet Printers>

The ink can be printed with the use of known inkjet printers. Examples of inkjet printers include a charge control-type printer and a drop-on-demand-type printer. When high-speed printing on an irregular surface is intended, a charge control-type printer is preferable because ink droplets ejected therefrom can travel longer distances.

EXAMPLES

Hereafter, the present invention is described in greater detail with reference to various experiments.

Example 1

To 85 g of methanol, color materials; i.e., 3 g of iron (III) acetylacetonate and 3 g of manganese (III) acetylacetonate, resin: i.e., 10 g of polyol resin, and a conducting agent; i.e., 0.5 g of lithium nitrate were added and dissolved therein with agitation. The resulting solution was filtrated through a polypropylene filter with a pore diameter of 0.5 μm. Thus, the ink of Example 1 was prepared.

The prepared ink was ejected from a charge control-type inkjet printer to form printing dots on a ceramic substrate. Ceramic substrates were used in the examples and the comparative examples below. As a result of observation of the printing dots, the diameter was found to be 400 μm and the average coating thickness was found to be 1 μm. The sizes of printing dots were the same in the examples and the comparative examples below.

Example 2

An ink was prepared in the same manner as in Example 1 except that cobalt (III) acetylacetonate was used instead of manganese (III) acetylacetonate, and printing dots were formed.

Example 3

An ink was prepared in the same manner as in Example 1 except that chromium (III) acetylacetonate was used instead of manganese (III) acetylacetonate, and printing dots were formed.

Example 4

An ink was prepared in the same manner as in Example 1 except that copper (II) ethyl acetoacetate was used instead of manganese (III) acetylacetonate, and printing dots were formed.

Example 5

An ink was prepared in the same manner as in Example 1 except that copper (II) ethyl acetoacetate was used instead of iron (III) acetylacetonate, and printing dots were formed.

Example 6

An ink was prepared in the same manner as in Example 1 except that the amount of methanol used was changed to 53 g, that of iron (III) acetylacetonate was changed to 5 g, that of manganese (III) acetylacetonate was changed to 10 g, and that of polyol resin was changed to 32 g, and printing dots were formed.

Example 7

An ink was prepared in the same manner as in Example 1 except that the amount of methanol used was changed to 53 g, that of iron (III) acetylacetonate was changed to 10 g, that of manganese (III) acetylacetonate was changed to 5 g, and that of polyol resin was changed to 32 g, and printing dots were formed.

Example 8

An ink was prepared in the same manner as in Example 1 except that the amount of methanol used was changed to 55 g, that of iron (III) acetylacetonate was changed to 5 g, 10 g of chromium (III) acetylacetonate was used instead of manganese (III) acetylacetonate, and 30 g of rosin resin was used instead of polyol resin, and printing dots were formed.

Example 9

An ink was prepared in the same manner as in Example 1 except that the amount of methanol used was changed to 55 g, that of iron (III) acetylacetonate was changed to 10 g, 5 g of chromium (III) acetylacetonate was used instead of manganese (III) acetylacetonate, and 30 g of rosin resin was used instead of polyol resin, and printing dots were formed.

Example 10

An ink was prepared in the same manner as in Example 1 except that the amount of methanol used was changed to 48 g, that of iron (III) acetylacetonate was changed to 10 g, that of manganese (III) acetylacetonate was changed to 10 g, and that of polyol resin was changed to 32 g, and printing dots were formed.

Example 11

An ink was prepared in the same manner as in Example 10 except that the amount of methanol used was changed to 50 g, and 30 g of styrene-acrylic resin was used instead of polyol resin, and printing dots were formed.

Example 12

An ink was prepared in the same manner as in Example 10 except that the amount of methanol used was changed to 50 g and 30 g of rosin resin was used instead of polyol resin, and printing dots were formed.

Example 13

An ink was prepared in the same manner as in Example 10 except that the amount of methanol used was changed to 45 g, that of polyol resin was changed to 35 g, and printing dots were formed.

Example 14

An ink was prepared in the same manner as in Example 11 except that the amount of methanol used was changed to 47 g, that of styrene-acrylic resin was changed to 33 g, and printing dots were formed.

Example 15

An ink was prepared in the same manner as in Example 12 except that the amount of methanol used was changed to 47 g, that of rosin resin was changed to 33 g, and printing dots were formed.

Comparative Example 1

An ink was prepared in the same manner as in Example 1 except that manganese (III) acetylacetonate was not added, and printing dots were formed.

Comparative Example 2

An ink was prepared in the same manner as in Example 1 except that iron (III) acetylacetonate was not added, and printing dots were formed.

Comparative Example 3

An ink was prepared in the same manner as in Example 1 except that only 3 g of cobalt (III) acetylacetonate was added as a color material, and printing dots were formed.

Comparative Example 4

An ink was prepared in the same manner as in Example 1 except that only 3 g of chromium (III) acetylacetonate was added as a color material, and printing dots were formed.

Comparative Example 5

An ink was prepared in the same manner as in Example 1 except that only 0.5 g of iron (II) phthalocyanine was added as a color material, and printing dots were formed.

Comparative Example 6

An ink was prepared in the same manner as in Example 1 except that 0.25 g of iron (II) phthalocyanine and 0.25 g of manganese (II) phthalocyanine were added as color materials, and printing dots were formed.

Comparative Example 7

An ink was prepared in the same manner as in Example 1 except that only 10 g of iron (III) nitrate 9-hydrate was added as a color material, and printing dots were formed.

Comparative Example 8

An ink was prepared in the same manner as in Example 1 except that the amount of methanol used was changed to 94 g and polyol resin was not added, and printing dots were formed.

The inks prepared in Examples 1 to 15 and Comparative Examples 1 to 8 were evaluated in terms of dissolution stability of the inks and visibility of printing dots. The inks prepared in Examples 10 to 15 were also evaluated in terms of printing quality.

Dissolution stability was evaluated in the manner described below. The inks prepared in Examples 1 to 15 and Comparative Examples 1 to 8 were introduced into glass containers in an amount of 10 g each, the resultants were allowed to stand at 20° C. for a month, and the occurrence of precipitates was visually inspected.

Concerning the visibility of printing dots, the printing dots formed in Examples 1 to 15 and Comparative Examples 1 to 8 were evaluated via visual inspection before heating, after heating at 500° C., and after heating at 1,000° C. Specifically, the printing dots were evaluated "Visible," "Hardly visible," or "Not visible" depending on the printing dot density, as shown in FIG. 1.

Figure 2:
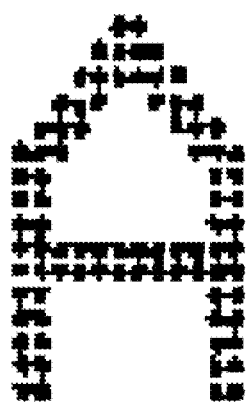
FIG. 2 shows the results of evaluation on printing quality of printing dots according to the examples.
Figure 2:
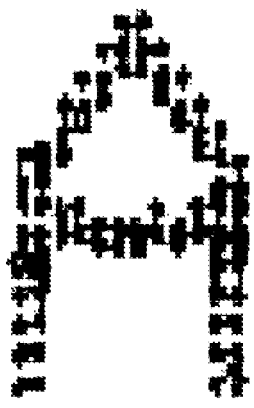

Printing quality was evaluated via visual inspection of sequences of printing dots formed with the inks prepared in Examples 10 to 15. Specifically, printing quality was evaluated "Good" or "Acceptable" in accordance with the sequence patterns of the printing dots, as shown in FIG. 2. Tables 2, 3, and 4 show the ink compositions of Examples and Comparative Examples and the test results.

TABLE 2

| | Category | Substance | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Composition (parts by weight) | Solvent | Methanol | 85 | 85 | 85 | 85 | 85 | 53 | 53 | 55 | 55 |
| | Color material | Iron (III) acetylacetonate | 3 | 3 | 3 | 3 | | 5 | 10 | 5 | 10 |
| | Color material | Manganese (III) acetylacetonate | 3 | | | | 3 | 10 | 5 | | |
| | Color material | Cobalt (III) acetylacetonate | | 3 | | | | | | | |
| | Color material | Chromium (III) acetylacetonate | | | 3 | | | | | 10 | 5 |
| | Color material | Copper (II) ethyl acetoacetate | | | | 3 | 3 | | | | |
| | Color material | Iron (II) phthalocyanine | | | | | | | | | |
| | Color material | Manganese (II) phthalocyanine | | | | | | | | | |
| | Color material | Iron (III) nitrate 9-hydrate | | | | | | | | | |
| | Resin | Polyol resin | 10 | 10 | 10 | 10 | 10 | 32 | 32 | | |
| | Resin | Styrene-acrylic resin | | | | | | | | | |
| | Resin | Rosin resin | | | | | | | | 30 | 30 |
| | Conducting agent | Lithium nitrate | 0.5 | 0.5 | 0.5 | 0.5 | 0.5 | 0.5 | 0.5 | 0.5 | 0.5 |
| Test results | | Dissolution stability of ink (20° C., allowed to stand for a month) | Not precipitated | Not precipitated | Not precipitated | Not precipitated | Not precipitated | Not precipitated | Not precipitated | Not precipitated | Not precipitated |
| | | Visibility of print coating (before heating) | Visible | Visible | Visible | Visible | Visible | Visible | Visible | Visible | Visible |
| | | Visibility of print coating (heated at 500° C.) | Visible | Visible | Visible | Visible | Visible | Visible | Visible | Visible | Visible |
| | | Visibility of print coating (heated at 1000° C.) | Visible | Visible | Visible | Visible | Visible | Visible | Visible | Visible | Visible |
| | | Printing quality | — | — | — | — | — | — | — | — | — |

TABLE 3

| | Category | Substance | Ex. 10 | Ex. 11 | Ex. 12 | Ex. 13 | Ex. 14 | Ex. 15 |
|---|---|---|---|---|---|---|---|---|
| Composition (parts by weight) | Solvent | Methanol | 48 | 50 | 50 | 45 | 47 | 47 |
| | Color material | Iron (III) acetylacetonate | 10 | 10 | 10 | 10 | 10 | 10 |
| | Color material | Manganese (III) acetylacetonate | 10 | 10 | 10 | 10 | 10 | 10 |
| | Color material | Cobalt (III) acetylacetonate | | | | | | |
| | Color material | Chromium (III) acetylacetonate | | | | | | |
| | Color material | Copper (II) ethyl acetoacetate | | | | | | |
| | Color material | Iron (II) phthalocyanine | | | | | | |
| | Color material | Manganese (II) phthalocyanine | | | | | | |
| | Color material | Iron (III) nitrate 9-hydrate | | | | | | |
| | Resin | Polyol resin | 32 | | | 35 | | |
| | Resin | Styrene-acrylic resin | | 30 | | | 33 | |
| | Resin | Rosin resin | | | 30 | | | 33 |
| | Conducting agent | Lithium nitrate | 0.5 | 0.5 | 0.5 | 0.5 | 0.5 | 0.5 |
| Test results | | Dissolution stability of ink (20° C., allowed to stand for a month) | Not precipitated | Not precipitated | Not precipitated | Not precipitated | Not precipitated | Not precipitated |
| | | Visibility of print coating (before heating) | Visible | Visible | Visible | Visible | Visible | Visible |
| | | Visibility of print coating (heated at 500° C.) | Visible | Visible | Visible | Visible | Visible | Visible |
| | | Visibility of print coating (heated at 1,000° C.) | Visible | Visible | Visible | Visible | Visible | Visible |
| | | Printing quality | Good | Good | Good | Acceptable | Acceptable | Acceptable |

TABLE 4

| | Category | Substance | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Composition (parts by weight) | Solvent | Methanol | 85 | 85 | 85 | 85 | 85 | 85 | 85 | 94 |
| | Color material | Iron (III) acetylacetonate | 3 | | | | | | | 3 |
| | Color material | Manganese (III) acetylacetonate | | 3 | | | | | | 3 |

TABLE 4-continued

| Category | Substance | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Color material | Cobalt (III) acetylacetonate | | | 3 | | | | | |
| Color material | Chromium (III) acetylacetonate | | | | 3 | | | | |
| Color material | Copper (II) ethyl acetoacetate | | | | | | | | |
| Color material | Iron (II) phthalocyanine | | | | | 0.5 | 0.25 | | |
| Color material | Manganese (II) phthalocyanine | | | | | | 0.25 | | |
| Color material | Iron (III) nitrate 9-hydrate | | | | | | | 10 | |
| Resin | Polyol resin | 10 | 10 | 10 | 10 | 10 | 10 | 10 | |
| Resin | Styrene-acrylic resin | | | | | | | | |
| Conducting agent | Lithium nitrate | 0.5 | 0.5 | 0.5 | 0.5 | 0.5 | 0.5 | 0.5 | 0.5 |
| Test results | Dissolution stability of ink (20° C., allowed to stand for a month) | Not precipitated | Not precipitated | Not precipitated | Not precipitated | precipitated | precipitated | precipitated | precipitated |
| | Visibility of print coating (before heating) | Visible | Visible | Visible | Visible | Visible | Visible | Not visible | Visible |
| | Visibility of print coating (heated at 500° C.) | Hardly visible | Visible | Visible | Visible | Not visible | Not visible | Visible | Visible |
| | Visibility of print coating (heated at 1,000° C.) | Visible | Hardly visible | Hardly visible | Hardly visible | Not visible | Not visible | Visible | Visible |
| | Printing quality | — | — | — | — | — | — | — | — |

As shown in Tables 2, 3, and 4, the tests concerning the dissolution stability of the inks demonstrate that the inks prepared in Examples 1 to 15 and Comparative Examples 1 to 4 with the use of metal complexes comprising ligands with diketone structures as color materials were not precipitated. In the case of the inks prepared in Comparative Examples 5 to 7 with the use of metal complexes comprising ligands without diketone structures or metal salts and the ink prepared in Comparative Example 8 without the addition of resin, precipitation was observed. The results demonstrate that the use of a ligand with a diketone structure as a metal complex ligand would improve dissolution stability and suppress precipitation and that the addition of resin would suppress a complex from precipitation.

In the test concerning the visibility of printing dots, the printing dots formed with the inks prepared in Examples 1 to 15 with the addition of 2 types of acetylacetonate complexes as color materials were found to be visible before heating, after heating at 500° C., and after heating at 1,000° C. In contrast, printing dots formed with the inks prepared in Comparative Examples 1 to 4 with the addition of a single type of an acetylacetonate complex were found to be hardly visible after heating at 500° C. or 1,000° C. The results demonstrate that the use of two types of metal complexes as color materials would provide an ink that can produce visible printing dots under extensive heating conditions.

The printing dots formed in Comparative Example 5 with the addition of iron (II) phthalocyanine and those formed in Comparative Example 6 with the addition of iron (II) phthalocyanine and manganese (II) phthalocyanine were visible before heating, although they became not visible after heating. While the printing dots formed in Comparative Example 7 with the addition of iron (III) nitrate 9-hydrate were visible after heating, they were not visible before heating.

In the test concerning printing quality, printing quality attained in Examples 10 to 12 was evaluated to be good. In contrast, printing quality attained in Examples 13 to 15 was evaluated to be inferior to that attained in Examples 10 to 12 but acceptable. While the viscosity of the inks prepared in Examples 10 to 12 was 4.5 mPa·s at 20° C., the viscosity of the inks prepared in Examples 13 to 15 was 5.5 mPa·s at 20° C. Because of high viscosity, the inks prepared in Examples 13 to 15 were not able to provide good printing quality.

On the basis of the results demonstrated above, the use of two types of metal complexes comprising ligands with diketone structures as color materials can provide an ink that produces visible printing dots under extensive heating conditions. It was also demonstrated that the addition of resin would suppress color materials from precipitation. It was further demonstrated that adjustment of the amount of resin to be added to bring the viscosity of the ink to 4.5 mPa·s or lower at 20° C. would lead to good printing quality.

It should be noted that the present invention is not limited to the examples demonstrated above and encompasses various modification embodiments. The examples above are provided to clarify the present invention and the present invention does not necessarily include all the constitutions described above. In addition, the constitution of a given example can be partially substituted with the constitution of another example, and a given example can be supplemented with the constitution of another example. Further, the constitution of an example can be partially modified with other constitutions via addition, deletion, or substitution.

The invention claimed is:

1. An ink for inkjet printers comprising a color material, a solvent, and resin, wherein the color material comprises a first metal complex and a second metal complex that is different from the first metal complex, each of the first metal complex and the second metal complex comprising metal ions and ligands bound thereto, the metal ions constituting the first metal complex are iron ions, the metal ions constituting the second metal complex are selected from manganese ions, cobalt ions, and chromium ions, and the ligands comprise diketone structures incorporated in the chemical structures thereof.

2. The ink for inkjet printers according to claim 1, wherein the ligand is acetylacetone or ethyl acetoacetate.

3. The ink for inkjet printers according to claim 1, wherein the first metal complex is iron (III) acetylacetonate and the second metal complex is manganese (III) acetylacetonate, cobalt (III) acetylacetonate, or chromium (III) acetylacetonate.

4. The ink for inkjet printers according to claim 1, wherein the content of the first metal complex and the second metal complex is 1% by mass to 30% by mass in total.

5. The ink for inkjet printers according to claim 1, wherein the content of the first metal complex and the second metal complex is 1% by mass to 15% by mass in total.

6. The ink for inkjet printers according to claim 1, wherein the resin content is more than 0% by mass to 32% by mass or less.

\* \* \* \* \*